Patented July 26, 1938

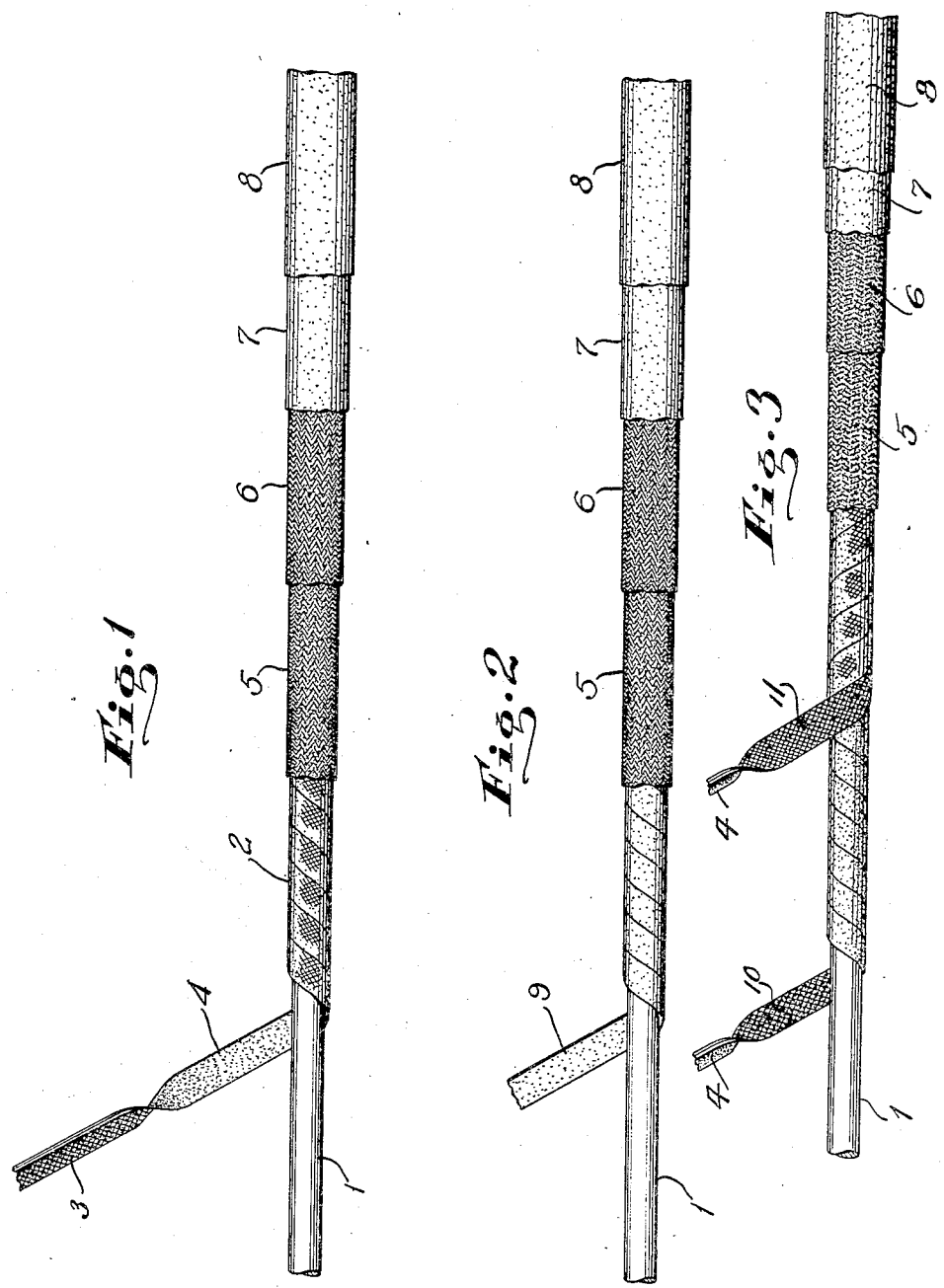

2,124,993

UNITED STATES PATENT OFFICE 2,124,993

INSULATED WIRE OR CABLE FOR THE TRANSMISSION OF ELECTRICAL ENERGY

Edward D. Youmans, Clifton, N. J., assignor to The Okonite Company, Passaic, N. J., a corporation of New Jersey Application June 6, 1934, Serial No. 729,213

5 Claims. (Cl. 173—264)

This invention is directed to the provision of a weatherproof wire for overhead power transmission and distribution, signal, telegraph and telephone lines, etc.

The insulated wire or cable of this application employs insulation which has a very high dielectric strength, which is of material importance with overhead wires, in that it overcomes grounding troubles where the wire is necessarily installed among tree branches; this feature is of importance also in preventing the occurrence of short circuits when adjacent wires come in contact as they frequently do in high winds.

The wire of the present invention is very highly resistant to moisture enabling it to retain its high dielectric strength in wet weather or when coated with ice and sleet.

I have found also that my wire for a given duty may be made smaller in size than customary. This is not only an advantage from an appearance standpoint where the wire is installed overhead along streets, highways, railroads, etc. but as will be appreciated very materially reduces the danger of broken lines from heavy ice and sleet loads and high wind pressure.

In the accompanying drawing:

Fig. 1 shows one embodiment of the invention;

Fig. 2 a modified embodiment; and

Fig. 3 a further modification.

Referring to the drawing in detail and first of all to Fig. 1, the conductor of the improved wire is designated 1 and may be any suitable metal having suitable properties including tensile strength and flexibility. Hard drawn copper wire, copper covered steel wire or bronze are suitable materials.

The conductor 1 is insulated with one or more layers of insulating tape designated 2. This tape is made from woven cotton cloth. The cloth is first thoroughly impregnated with a rubber compound which has high dielectric strength and is moisture resistant. The cloth may be impregnated by a friction calendering process, the fabric being passed twice through the calendering machine so that it is first impregnated from one side and then from the other; or it may be impregnated by a spreader instead of by a friction calender. After impregnation the cloth 2 is coated on one side with a substantial layer or thickness of the rubber insulating compound. In the drawing the impregnating compound is designated 3 and the coating of rubber insulating compound is designated 4.

The tape as thus prepared is applied about the conductor 1 helically with a small overlap and in the desired number of layers with the insulating compound next to the conductor. Alternatively the tape may be applied longitudinally. If desired the tape may be vulcanized after application to the conductor, by exposure to steam at the necessary temperature and pressure. The wire or cable may then be run through a bath of a sealing compound such as hot wax or an insulating lacquer.

About the tape 2 braid is applied, either a single braid or a plurality of braids. These braids have been designated 5 and 6 on the drawing, two braids being shown for purposes of illustration. The braids are cotton braids thoroughly saturated and finished with electric insulating weather and moisture resistant materials. The material preferred for saturating the braids is a compound widely known as Harvel, consisting substantially of an acid condensation product made from the oil obtained from cashew nut shells. Over the saturated braid covering is applied a coating of mineral wax 7 and as this material is slightly tacky, a coating of powdered mica or talc or like material 8 is applied over the outer surface of the wire to render the same non-tacky.

It has been found that the dielectric strength of a wire or cable constructed as above described is very high, which, as above pointed out, is of very material advantage in overcoming grounding troubles where the wire is installed overhead among the branches of trees and in preventing short circuits, when, for example, adjacent wires come in contact as they frequently do in high winds. It will be appreciated also that my novel construction renders the insulation highly moisture resistant so that its high dielectric strength is unimpaired even in wet weather or when coated with ice and sleet.

By employing the tape 2 it will be appreciated that the wire approaches a rubber insulated wire in its various characteristics, the design of the present invention, however, being such that materials of a higher quality especially from a standpoint of dielectric strength, moisture resistance and long life can be used than would be possible in a standard rubber insulated wire due to cost.

All of the advantages above noted inherent in my improved construction are material, as will be appreciated by those skilled in this art, in reducing maintenance costs and loss of revenue due to service interruptions, and other incidental benefits realized through continuity of service in power distribution, signal service, communication service, etc.

In the embodiment of the invention illustrated in Fig. 2 the same structure is employed except that the impregnated cloth 2 has been substituted by a paper tape designated 9. This tape is treated with Harvel compound which as above noted is an acid condensation product made from the oil obtained from cashew nut shells. As in the form or structure of Fig. 1 the paper tape 9 provides superior dielectric strength, moisture resistance and insures a wire of small overall diameter for a given conductor size.

The embodiment of my invention illustrated in Fig. 3 is similar to Fig. 1, except that I employ two tapes 10 and 11 in place of the tape 2 of Fig 1. These tapes may be wound about the conductor in the same direction, or as shown, in opposite directions, but in any event, the inner tape 10 is applied with the rubber compound 4 on the outer face and tape 11 with the compound 4 on its inner face so as to provide a continuous layer of the rubber compound 4 without fabric extending through it. This is advantageous from the standpoint of dielectric strength especially under wet conditions.

What I claim is:—

1. The process which comprises providing at least one face of each tape of a pair of tapes with a layer of insulating rubber compound and applying the tapes in superimposed relation about a conductor with the rubber compound layers in contact, the layers of compound being of sufficient thickness definitely to space the tapes from each other and to provide a compound layer without any portion of the tapes extending through it.

2. The process which comprises impregnating a plurality of tapes with a rubber compound of high dielectric strength, providing at least one face of each tape with a layer of insulating rubber compound and applying the tapes in superimposed relation about a conductor with the rubber compound layers in contact, the layers of compound being of sufficient thickness to maintain the tapes spaced from each other and to provide a layer of compound which is free of tape.

3. The process of making an insulated conductor, which process comprises impregnating a plurality of tapes with an insulating rubber compound, providing at least one face of each tape with a layer of insulating rubber compound and applying the tapes in superimposed relation about a conductor with the rubber compound layers in contact, the layers of compound being of sufficient thickness definitely to space the tapes from each other and to provide a layer of compound which is free of tape, and vulcanizing the rubber compound layers to each other.

4. The process of making an insulated conductor, which process comprises impregnating a plurality of tapes with a rubber compound of high dielectric strength, providing at least one face of each tape with a layer of insulating rubber compound, applying the tapes in superimposed relation about a conductor with the rubber compound layers in contact, the layers of compound being of sufficient thickness definitely to space the tapes from each other and to provide a layer of compound which is free of tape, and applying a fibrous covering saturated with electrical insulating weather and moisture-resistant material about said tapes.

5. The process of making an insulated conductor, which process comprises providing at least one face of each tape of a pair of tapes with a layer of insulating rubber compound, applying the tapes in superimposed relation about a conductor with the rubber compound layers in contact, the layers of compound being of sufficient thickness to maintain the tapes in spaced relation and to provide a compound layer without any part of the tapes extending through it, and vulcanizing the rubber compound layers to each other and applying a fibrous covering saturated with an acid condensation product made from the oil obtained from cashew nut shells immediately about said tapes, coating the same with a mineral wax, and then applying a dry powder coating to said mineral wax.

EDWARD D. YOUMANS.